United States Patent
Bruesselbach et al.

(10) Patent No.: US 6,987,789 B2
(45) Date of Patent: Jan. 17, 2006

(54) MULTIPLE-DISK LASER SYSTEM

(75) Inventors: Hans W. Bruesselbach, Monte Nido, CA (US); David S. Sumida, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 227 days.

(21) Appl. No.: 10/383,376

(22) Filed: Mar. 6, 2003

(65) Prior Publication Data

US 2004/0095975 A1    May 20, 2004

Related U.S. Application Data

(60) Provisional application No. 60/426,671, filed on Nov. 14, 2002.

(51) Int. Cl.
H01S 3/091    (2006.01)
(52) U.S. Cl. .............................. 372/70; 372/67; 372/72
(58) Field of Classification Search ................ 372/67, 372/70, 72, 75
See application file for complete search history.

(56) References Cited

U.S. PATENT DOCUMENTS

| | | | |
|---|---|---|---|
| 3,633,126 A | 1/1972 | Martin | 331/94.5 |
| 5,148,441 A | 9/1992 | Itai | 372/70 |
| 5,237,584 A * | 8/1993 | Shannon et al. | 372/93 |
| 5,696,786 A * | 12/1997 | Durkin et al. | 372/75 |
| 6,339,605 B1 | 1/2002 | Vetrovec | 372/35 |
| 2002/0075934 A1 | 6/2002 | Ludewigt et al. | 372/70 |

FOREIGN PATENT DOCUMENTS

| | | |
|---|---|---|
| DE | 197 28 845 A1 | 1/1999 |
| EP | 0 869 591 A1 | 10/1998 |
| FR | 2 785 098 | 4/2000 |

OTHER PUBLICATIONS

U.S. Appl. No. 60/412,284, filed Sep. 20, 2002, Sumida et al.
Hügel, H., et al., "Solid State Thin Disc Laser," *SPIE*, vol. 3574, pp 15-27.
Keirstead, M., "Pump Up the Volume," *SPIE's OE Magazine*, pp 42-46 (Nov. 2001).
Giesen, A., et al., "Scalable Concept For Diode-Pumped High-Power Solid-State Lasers," *Applied Physics B: Photophysics and Laser Chemistry*, vol. B 58, pp. 365-372 (1994).

* cited by examiner

*Primary Examiner*—Minsun Oh Harvey
*Assistant Examiner*—James Menefee
(74) *Attorney, Agent, or Firm*—Ladas & Parry LLP

(57) ABSTRACT

A laser system for producing a laser beam, the laser system having top and bottom heat-sinking bars forming the structure of the laser system and plurality of disks comprising a laser material mounted on both the bottom heat-sinking bar and the top heat-sinking bar. Also mounted on both heat-sinking bars is a plurality of pump diode bars. Each pump diode bar is preferably mounted opposite a corresponding laser disk on the opposite heat-sinking bar. The pump diode bars and the disks are symmetrically mounted on the top and bottom heat-sinking bars, so that each heat-sinking bar has an alternating pattern of pump diode bars and laser disks. The laser system is configured such that the lasing beams impinge on the disks with an incidence angle far off normal.

32 Claims, 4 Drawing Sheets

MULTIPLE-DISK LASER SYSTEM

CROSS-REFERENCE TO RELATED APPLICATIONS

This application claims benefit of U.S. Provisional Application No. 60/426,671 filed on Nov. 14, 2002, which is incorporated herein by reference in its entirety.

BACKGROUND

1. Field

This disclosure relates generally to diode pumped laser systems and, more particularly, to diode pumped laser systems using multiple disks.

2. Description of Related Art

The principle of laser operation is stimulated emission of energy. When an electron is in an upper (i.e., excited) energy level of the laser material and a lightwave of precisely the wavelength corresponding to the energy level difference between the unexcited and excited states strikes the electron, the light stimulates the electron to move down to the lower level and emit a photon. This photon is emitted in precisely the same direction and phase with that of the incident photon. Thus, a light wave is established in the laser material, and if it can be made to travel back and forth through the laser material (also known as the gain media) it will retain its frequency and grow in amplitude as it stimulates photon emissions.

This positive feedback mechanism is typically accomplished by a mirror placed at each end of the lasing material to reflect the traveling wave back through the lasing material. The rear mirror is fully reflecting, and the front mirror is partially reflecting and partially transmitting at the laser wavelength. Light reflected back and forth from the front and rear mirrors serves as positive feedback to sustain oscillation, and the light transmitted through the front mirror is the laser output light. The two mirrors are parallel and form an optical cavity that can be tuned by varying the spacing between them. In the case where the laser cavity is configured as a standing-wave resonator, the laser operates only at those wavelengths for which a standing-wave pattern can be set up in the cavity, i.e., for which the length of the cavity is an integral number of half wavelengths.

Laser systems generally comprise laser materials having four energy levels (a four-level system) or three energy levels (a three-level system). A material which has four energy levels involved in the lasing process is significantly more efficient than a material having three energy levels. At room temperature for a four-level system, the electron ground state is almost entirely occupied, while the lower laser level and the upper energy levels are essentially unoccupied. When the upper energy level has a greater electron population than the lower level, a population inversion exists. This inverted population can support lasing since a traveling wave of the proper frequency stimulates downward transitions of the electrons with the associated energy release.

The process of exciting the laser material to raise the electrons to an excited state, i.e., producing a population inversion, is referred to as pumping. Pumping can be accomplished optically with a flash lamp driven at a high frequency, by an electric discharge, by a chemical reaction, or, in the case of a semiconductor laser, by injecting electrons into the upper energy level with an electric current. When a sufficient number of electrons are in an excited state, the laser energy can be released by allowing the traveling wave to exit the laser cavity.

Many types of lasers exist in the prior art, including slab and disk laser systems, which use various laser materials. For many applications, the power scaling capability-and/or gain of such systems is inadequate. It would thus be useful to provide a laser system with improved power scaling and/or gain.

One of the laser materials used in slab and disk laser systems is $Nd:YVO_4$. This material, with its broad pump bands and high gain, may be used advantageously in systems which are required to perform over a wide range of ambient temperatures, as well as in systems requiring short Q-switched pulse durations at high repetition rate, or high gain. However, because of the thermomechanical fragility of $Nd:YVO_4$, laser systems using this material are very difficult to scale in power. Prior art systems using $Nd:YVO_4$ typically consist of slugs (short rods) with diffusion bonded end caps, edge-pumped slabs, or rods. In such prior art systems, even with compensation for thermally induced aberrations, power scaling beyond a few tens of Watts is usually not possible.

One type of laser uses face-pumped disks, which provide an attractive pumping and extraction geometry because they minimize thermally induced optical aberrations in the beam propagation direction. However, the disks suffer from parasitic lasing and power scaling limitations. Power scaling may be accomplished by using multiple disks. However, accessing each one of the disks at near-normal incidence with the extraction lasing and the pump beams is difficult to achieve. Indeed, in order to limit thermally induced optical aberrations, prior art systems require that the extracting optical beam impinge on the disks at near normal incidence. This is because thermally induced aberrations are minimized when the optical path is parallel to the heat-flow, which is typically perpendicular to the disks.

Spectra-Physics of Mountain View, California has designed a laser apparatus using multiple end-pumped laser rods known as the Inazuma Periodic Resonator. This design is depicted in FIG. 1. In FIG. 1, the laser apparatus 10 comprises at least two laser rods 16 made of $Nd:YVO_4$ through which a resonant laser beam 21 is directed in a zig-zag fashion. An aperture 14 assists in coupling the resonant laser beam 21 from one laser rod 16 to the other laser rod 16. The resonant laser beam 21 resonates between a high reflector 11 and an output coupler 12 and is directed into the ends of the laser rods by dichroic mirrors 13. Fiber coupled pump light 25 is coupled to the laser rods 16 by imaging optics 15 directing the pump light 25 through the dichroic mirrors 13 and into the ends of the laser rods 16. The output 23 of the laser apparatus 10 is produced by the output coupler 12. Additional laser rods 16 may be used to allow the output of the laser apparatus 10 to be scaled to higher powers.

As can be seen from FIG. 1, the Inazuma Periodic Resonator requires a rather complicated geometry for providing pump energy to the laser rods. In particular, the dichroic mirrors 13 must accurately direct both the resonant laser beam 21 and the pump light 25 into the laser rods 16. Further, the laser rods 16 must be cooled or coupled to a heat sink to direct heat out of the laser rods 16.

Another laser apparatus using multiple laser disks is described by H. Hügel and W. L. Bohn in "Solid State Thin Disk Laser," *Proc. SPIE-Int. Soc. Opt. Eng.* (USA), Vol. 3574, 1998, pp. 15–28. The Hügel reference describes the use of multiple discs in order to allow scaling of the laser to higher power. FIG. 9 depicts an example of a multiple disk laser apparatus 900 as described in Hügel. FIG. 9 shows two laser disks 910 mounted on heat sinks 920. The apparatus 900 further comprises a reflector 930 and an output coupler 940. These elements are disposed to allow a laser beam 950 to propagate in a zig-zag manner within the apparatus 900 and then to be output at the output coupler 940.

Hügel does not specifically describe a preferred laser pump mechanism for use with the apparatus depicted in FIG. 9, but Hügel generally describes quasi-longitudinal or radial pumping schemes. The Hügel reference primarily addresses the thermal effects of pumping active laser medium encountered in scaling the laser power to higher powers. However, in the approaches described by Hügel, several problems remain unresolved, including parasitic oscillation.

Therefore, there exists a need in the art for a laser apparatus that provides for improved power scaling and/or gain without complicated optical devices or a high number of components. Further, the laser apparatus should provide for power scaling while minimizing parasitic oscillations and losses. Finally, the laser apparatus should provide compensation for thermally induced aberrations.

SUMMARY

It is an advantage of the present invention to provide an apparatus and method for pumping a laser that allows for improved power scaling while minimizing parasitic lasing effects and losses. It is a further advantage of the present invention to provide a method and apparatus for pumping a laser with a simple geometry and to minimize the components used.

An embodiment of the present invention provides a multiple disk laser system for producing a laser beam, the laser system having top and bottom heat-sinking bars forming the structure of the laser system. A plurality of disks comprising a laser material is mounted on both the top surface of the bottom heat-sinking bar and the bottom surface of the top heat-sinking bar. Also mounted on both heat-sinking bars is a plurality of pump diode bars. Each pump diode bar is preferably mounted opposite a corresponding laser disk on the opposite heat-sinking bar. Preferably, the pump diode bars and the disks are symmetrically mounted on the top and bottom heat-sinking bars, so that each heat-sinking bar has an alternating pattern of pump diode bars and laser disks. The laser system is preferably configured such that the lasing or extracting beams impinge on the disks with an incidence angle far off normal, preferably with an incidence angle near Brewster's angle for the laser material used. In a preferred embodiment, the laser material is Nd:YVO$_4$ and the number of disks used in the system is preferably an even number.

In accordance with the present invention, the parasitic oscillation problem is addressed by using enough disks (typically, two or more disks) so that the total optical path length through the disks is greater than the transverse path length within a single disk. Having the highest gain along the path taken by the optical beam tends to reduce parasitic oscillation transverse to the optical path. This allows the use of larger disks than those typically used in laser systems having multiple disks, such as the apparatus disclosed in Hügel, discussed above.

Further, in accordance with the present invention, the extracting beams are purposely directed at the disks with a far from normal incidence, whereas in conventional disk lasers, the goal is to direct the extracting beams with near normal incidence on the disks. Having an angle of incidence far from normal goes against conventional wisdom in the art of disk laser design. This is because when the beam path is no longer parallel to the thermal gradients, thermal distortion of the optical beam occurs. To compensate for this thermal distortion, embodiments of the present invention preferably use an even number of disks, so that alternating bounces compensate for the thermal distortions. This is similar to the thermal compensation seen in prior art laser systems using a zig-zag slab geometry, that is, where the lasing beam propagates within a slab of laser material in a zig-zag manner. An additional advantage of having the extracting beam far from normal incidence, is that more space is made available opposite the disks, thus allowing pump diodes to be positioned closer to the disks. Therefore, the pumping geometry of embodiments of the present invention is generally simpler than the geometries used in prior art systems, such as the geometry of the Inazuma Periodic Resonator discussed above.

Additionally, in a preferred embodiment of this invention, Nd:YVO$_4$ is used as the laser material. Although Nd:YVO$_4$ has poorer thermal and mechanical properties than Nd:YAG crystals, for example, it has a much higher laser cross section (and therefore higher gain). The parasitic oscillation resulting from the higher gain is dealt with by using multiple disks. Hence, embodiments of the present invention may use much larger disks than those typically used in prior art laser systems. Further, embodiments of the present invention make use of the anisotropy of Nd:YVO$_4$ in order to minimize parasitic oscillations and losses.

In accordance with the present invention, the incidence of the extracting optical beam is off-normal. For any given disk, the aberrations resulting from off-normal incidence of the extracting beam, are compensated by a nearby disk. Under these conditions, the extracting optical beam angle of incidence may be as large as Brewster's angle, where the Fresnel reflection loss is near zero for one polarization.

Having a large angle of incidence for the laser beam allows placing the pump diodes in close proximity to the disks, greatly simplifying the pump geometry. Further, minimal pump beam conditioning and/or transport optics are required. Thus, embodiments of the present invention eliminate the need for fibers, fiber bundles, lenslets, lenses, specially shaped mirrors, non-imaging concentrators, lense ducts or other devices, which are normally required in prior art systems.

When the number of disks exceeds the ratio of the equivalent disk diameter to twice the disk thickness, the gain along the extracting beam's path is larger than the gain along the diameter of any one disk. The equivalent disk diameter is the diameter of the pump beam incident on the disk (i.e., the diameter of the active gain (pump) region of the disc). This provides that parasitic oscillation is reduced from what is the case in an edge-pumped or face-pumped slab using a zig-zag path with a similar number of bounces or fewer, more highly pumped disks.

Embodiments according to the invention described herein may be considered to have a geometry which is a hybrid between a disk geometry and a slab geometry. Indeed, embodiments of the present invention preferably combine any even number of disks in such a way that the diode pump lasers and extraction beams simply, efficiently, and compactly address the laser crystal, while at the same time residual aberrations inherent to the angled beam path are compensated, parasitic oscillations are minimized, and low loss along the optical path is achieved.

The laser disks used with embodiments of the present invention preferably comprise one or more layers of an active lasing material diffusion bonded to one or more layers of a laser inactive substrate and/or capping substrate. Such laser disks provide improved thermal properties that provide for higher laser powers.

An embodiment of the present invention provides a laser apparatus for producing a laser beam. This embodiment preferably comprises: one or more first side laser disks and one or more first side laser pump devices disposed in an alternating fashion on a first side of a pump cavity; one or more second side laser disks and one or more second side laser pump devices disposed in an alternating fashion on a second side of the pump cavity; where each first side laser disk is disposed to receive pump energy from a corresponding second side laser pump device and each second side laser disk is disposed to receive pump energy from a corresponding side laser pump device and the laser beam propagates within the pump cavity in a zig-zag manner from each first side laser disk to a second side laser disk and from each second side laser disk to a first side laser disk. This embodiment preferably comprises a highly reflective element disposed at one end of the pump cavity and a coupler element disposed at the other end of the pump cavity.

Another embodiment of the present invention comprises an apparatus for generating laser light. This apparatus preferably comprises: a highly reflective means and a partially reflective means disposed at separate ends of a pump cavity for laser light; a plurality of face-pumped planar laser media disposed within the pump cavity; and a plurality of means for generating laser pump energy disposed within the cavity, each of the means for generating laser pump energy directing pump energy to a corresponding one faced-pumped planar laser media of the plurality of face-pumped planar laser media, where the plurality of face-pumped laser media are cooperatively aligned with the highly reflective means and the partially reflective means such that laser light propagating in the pump cavity is incident on each one of the plurality of face-pumped laser media at a non normal angle and the laser lights travels between the highly reflective means and the partially reflective means in a zig-zag path.

Still another embodiment of the present invention comprises a method for generating laser light. The method preferably comprises the steps of: providing pump cavity having an upper side, a lower side opposite the upper side, a first end, and a second end opposite the first end; disposing one or more planar laser media on the upper side of the pump cavity, disposing one or more planar laser media on the lower side of the pump cavity; applying pump energy to the one or more planar laser media on the upper side and the one or more planar laser media on the lower side; and reflecting laser light between the first end and the second end such that the laser light enters each one of the one or more planar laser media at an angle approximately equal to the Brewster's angle for the planar laser media and the laser light propagates in the pump cavity in a zig-zag path between the planar laser media on the upper side and the planar laser media on the lower side.

BRIEF DESCRIPTION OF THE DRAWINGS

The features and advantages of the present invention will become better understood with regard to the following description, appended claims, and accompanying drawings.

DETAILED DESCRIPTION

Figure 1:
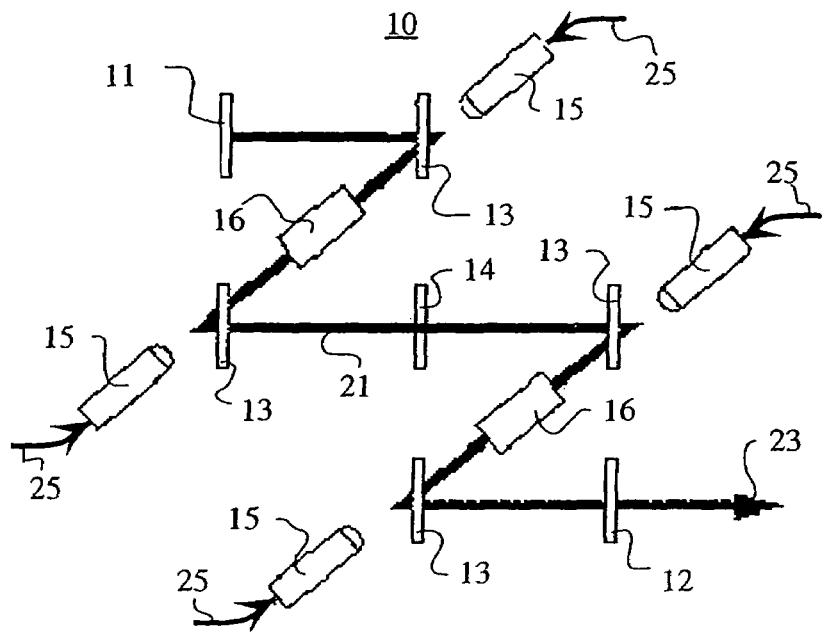
FIG. 1 (prior art) shows a schematic representation of the Inazuma Periodic Resonator.

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of layers and other elements shown in the accompanying drawings may be exaggerated to more clearly show details. The present invention should not be construed as being limited to the dimensional relations shown in the drawings, nor should the individual elements shown in the drawings be construed to be limited to the dimensions shown.

Figure 2:
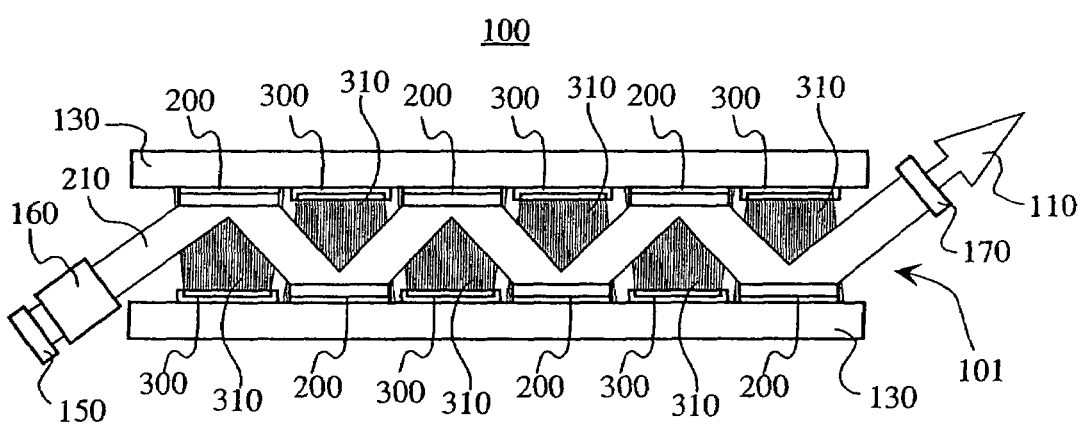
FIG. 2 is a schematic representation of a side view of a laser system in accordance with the present invention.

A laser apparatus 100 according to an embodiment of the present invention is shown in FIG. 2. The laser apparatus 100 comprises pump cavity 101 with a plurality of laser disks 200 and a plurality of laser pump devices 300 mounted on heat sink bars 130. The laser apparatus 100 also preferably further comprises a highly reflective element 150 (e.g., a mirror) and an output coupler 170 (e.g., a partial mirror). The laser pump devices 300 and laser disks 200 are mounted so that the laser pump devices 300 provide pump energy 310 to the laser disks 200. Also, the laser disks 200 and the laser pump devices 300 are disposed in an alternating fashion along the linear directions of the heat sink bars 130. The highly reflective element 150 and the output coupler 170 are mounted so that a lasing beam 210 traveling within the pump cavity 101 will travel in a zig-zag path. Mounting the laser disks 200 and the laser pump devices 300 in an alternating fashion also supports the zig-zag path that the lasing beam 210 will travel between the highly reflective element 150 and the output coupler 170 before being output as the laser apparatus output 110. Thus, the highly reflective element 150 and the output coupler 170 provide oscillatory feedback in order to form a laser oscillator cavity. Further, the highly reflective element 150 and the output coupler 170 are disposed relative to the laser disks 200 to ensure that the lasing beam 210 will travel in the aforementioned zig-zag path. A Q-switch 160 may be used to provide for pulsing the laser output 110.

Figure 3:
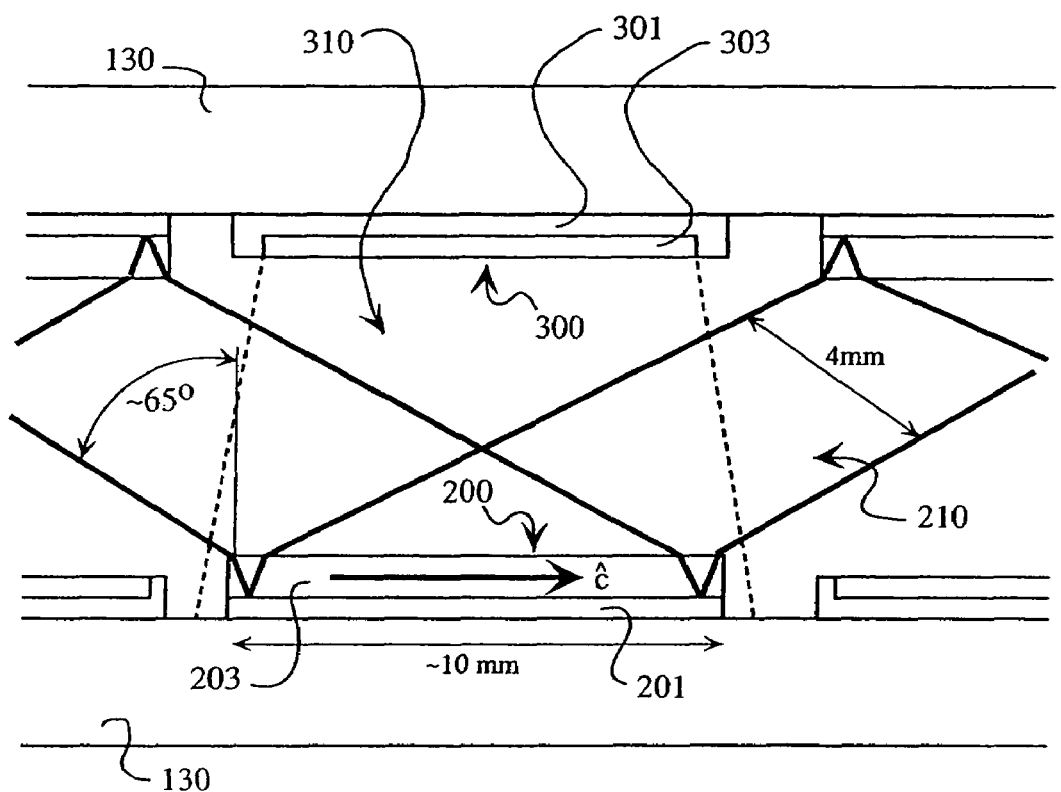
FIG. 3 is an enlarged view of a unit cell of the laser system depicted in FIG. 2.

An enlarged portion of the laser apparatus 100 is shown in FIG. 3. FIG. 3 shows a unit cell of the laser apparatus 100 plus portions of adjacent unit cells. A unit cell comprises a laser disk 200 mounted on one heat sink bar 130 and a laser pump device 300 mounted directly opposite the laser disk 200 on the other heat sink bar 130 so that pump energy 310 from the laser pump device 300 is directed onto the laser disk 200. The laser pump device 300 may comprise one or more diode bars 303 mounted on a diode bar substrate 301. The laser disk 200 may comprise a layer 203 of suitable laser material disposed on top of substrate material 201. Preferred compositions of the laser disks 200 are discussed in additional detail below.

Figure 4:
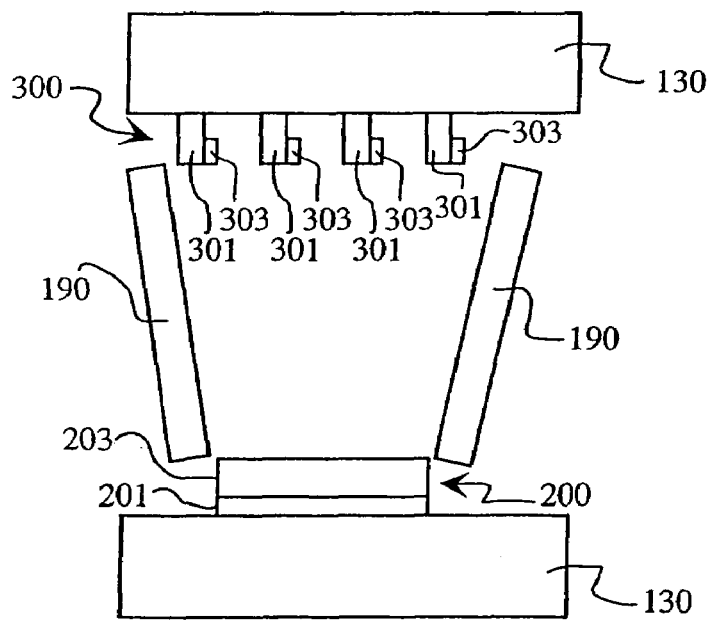
FIG. 4 is a schematic representation of an end view of the laser system depicted in FIG. 2.

FIG. 4 shows an end view of the laser apparatus 100 depicted in FIG. 2. FIG. 4 shows four laser pump devices 300 disposed opposite the laser disk 200. Each laser pump device 300 again preferably comprises a diode bar 303 mounted on a diode bar substrate 301, although other pump devices known in the art may be used. While FIG. 4 depicts four diode bars 303 being used to generate pump radiation, any number of diode bars 303 may be used according to the size of the laser pump device 300, the size of the laser disk 200, the amount of pump energy to be generated, and other parameters known to those skilled in he art. FIG. 4 also depicts the preferable use of mirrors 190 located to direct the pump energy 310 from the laser pump devices 300 to the laser disks 200.

The output of diode lasers in the diode bars 303 preferably directly illuminate the laser disk 200 located beneath the diode bars 303. This direct illumination provides for efficient and uniform optical pumping of the laser disks 200, to the extent that the integrated far field output pattern of the diode bars 303 is uniform, without incurring losses associated with intervening optics, such as the losses incurred with the Inazuma apparatus discussed above. The divergence typical of a diode beam bar in its so-called slow axis is typically ±5°, as shown in FIG. 3 by the dashed lines. Pumping is preferably aided in the large divergence direction (i.e., fast axis) by the two mirrors 190 located between and nearly perpendicular to the heat sink bars 130, as shown in FIG. 4. The mirrors 190 channel the pumping energy 310 emitted by the diode bars 303 so that most of the energy 310 reaches the laser disks 200 and more efficient pumping is achieved.

The laser disks 200 are preferably of a rectangular or elliptical shape, although other suitable shapes will be apparent to the skilled person. The size of the disks 200 is preferably chosen to be compatible with the size of diode bars 303. In a preferred embodiment, the disks 200 are about 10 mm long. The width of the disks is preferably less than or equal to the length of the disks 200 and is typically about one-half the length.

Each laser disk 200 comprises one or more layers 203 of a lasing medium. The lasing medium may comprise any crystalline, polycrystalline, or glass lasing material, although neodynmimum-doped yttrium vanadate (Nd:YVO$_4$) is preferred, as discussed below. Preferably, a high reflectivity coating is applied to the bottom of each disk 200 and an anti-reflective coating is applied to the top of each disk 200. High reflectivity and anti-reflective coatings well-known in the art may be used in accordance with the present invention. It is preferred that the laser disks be fabricated so as to minimize reflections from the edges of the laser disk 200. Methods for minimizing reflections are known in the art, such as roughening the edges of the disk 200, which should be adequate to prevent transverse oscillation. It is also preferred that each laser disk 200 additional comprise a thermally conducting substrate layer 201. The thermally conducting substrate layer 201 provides for the transfer of the thermal load generated in the one or more layers 203 of the lasing medium to the heat sink bars 130.

The crystallographic orientation of the lasing medium is preferably chosen such that the component of the electromagnetic field (i.e., pump energy 310) which is parallel to the diode bars 303 is maximally absorbed. For example, when Nd:YVO$_4$ is used as the laser material, the crystal is preferably disposed such that the "ĉ" axis of the Nd:YVO$_4$ crystal is parallel to the fast axis (i.e. parallel to the longest dimension of the diode bar) of the laser diode bars 303. FIG. 3 shows the preferred crystallographic orientation of the "ĉ" axis in relation to the laser diode bars 303. This orientation has the added advantage to minimize the possibility of parasitic oscillation, since Nd:YVO$_4$ in this orientation does not exhibit a gain at the lasing wavelength for a wave traveling along the length of the crystal (i.e., propagation along the "ĉ" axis).

Preferred embodiments for laser disks 200 for use in embodiments of the present invention are further described in the copending and commonly assigned patent application, "Laser Apparatus with Improved Thermal Stress Resistance," U.S. Ser. No. 60/412,284 filed Sep. 20, 2002, incorporated herein by reference. This patent application describes diffusion bonding the one or more layers of lasing medium to a substrate to provide for improved thermal properties. This patent application also describes thermally conducting materials suitable for use as the substrate. In particular, this patent application describes the fabrication of laser disks that can be scaled to the larger sizes suitable for use in the present invention without an increased probability of cleavage failure.

Figure 8:
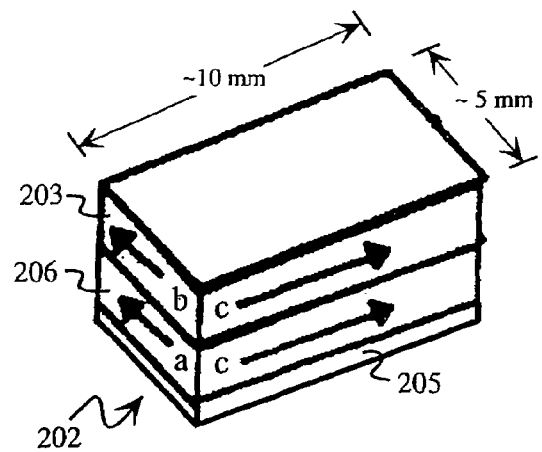
FIG. 8 depicts the structure of a laser disk for use with embodiments of the present invention.
Figure 9:
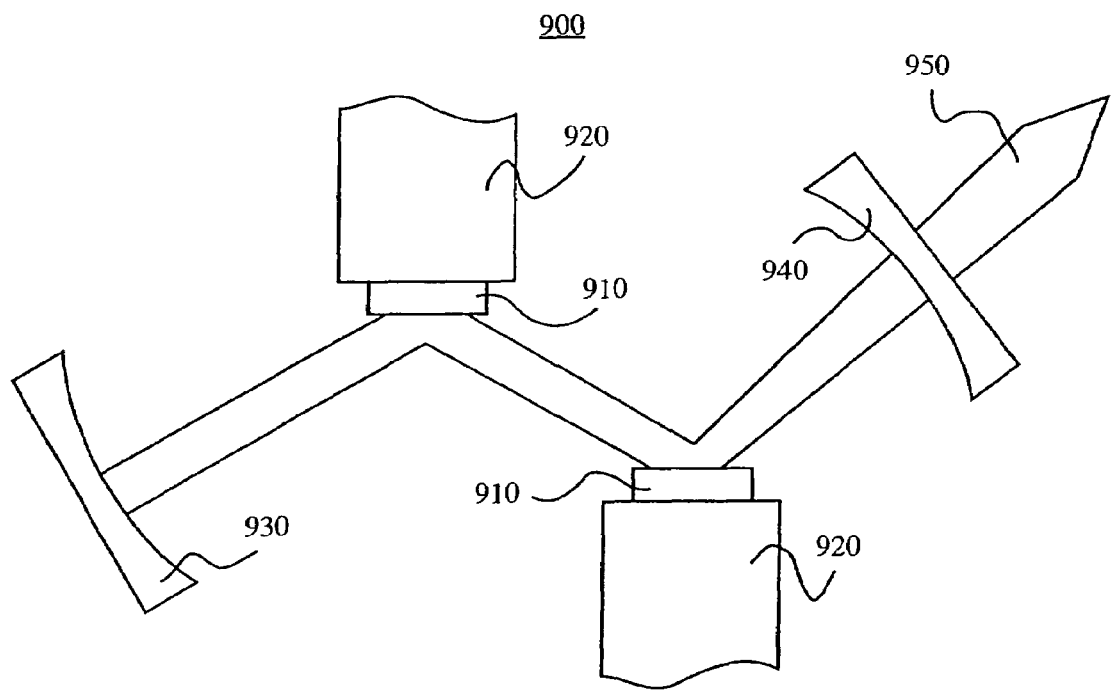
FIG. 9 (prior art) depicts a prior art multiple disk laser apparatus.

FIG. 8 shows an alternative laser disk 202 for use with embodiments of the present invention. The alternative laser disk 202 has a capping layer 203 comprising laser inactive material (such as undoped YALO) deposited on top of a layer 206 of a laser active material, such as Nd:YVO$_4$. A highly reflective coating 205 is deposited beneath the laser active material layer 206. This alternative laser disk 202 allows for minimal gradient of temperature, ΔT, across the interface from bottom surface of lasing active material layer 206 to a heat sink coupled to the bottom surface. The capping layer 203 provides added strength at the hotter top surface of the laser active material layer 206. The alternative laser disk 202 is described in further detail in the application "Laser Apparatus with Improved Thermal Stress Resistance," U.S. Ser. No. 60/412,284.

FIG. 8 also illustrates the preferred crystallographic orientation of the lasing medium. As shown in FIG. 8, the "ĉ" axis of the laser active material layer 206 is oriented to be parallel with the longer dimension of the laser disk 202. As described above, this orientation minimizes the possibility of parasitic oscillation. Note that FIG. 8 depicts a rectangular laser disk. Alternative laser disks may have an elliptical shape. Where the disks have an elliptical shape, the "ĉ" axis of the laser active material is preferably parallel to the major axis of the ellipse.

As noted above, in a preferred embodiment of the present invention, the lasing medium comprises Nd:YVO$_4$. Laser disks 200 comprising Nd:YVO$_4$, with its broad pump bands and high gain, provide for operation over a large ambient temperature range and with short Q-switched pulse durations at high repetition rate. However, as previously discussed, prior art laser systems using laser disks comprising Nd:YVO$_4$ generally have a disadvantage in that they do not compensate for thermally induced aberration, and, therefore, do not allow for power scaling beyond a few tens of Watts. Also, as discussed above, prior art systems generally suffer from problems related to parasitic oscillations.

Embodiments of the present invention address the problems related to thermal aberrations and parasitic oscillations by using more than one or two laser disks to provide for laser beam generation. As can be seen from FIGS. 2–4, the lasing beam 210 generated within the laser apparatus 100 preferably enters and leaves each laser disk 200 at an angle far from normal incidence. Use of a plurality of laser disks receiving and producing the lasing beam at a non-normal angle provides that the total optical path length through the disks is greater than the transverse path length within a single disk. Having the highest gain in the path that the optical beam takes discourages parasitic oscillation transverse to this direction. It is noted that, in most prior art devices, it is desirable to keep the laser beams at near normal incidence to the laser disks. If the beam path is no longer parallel to the thermal gradients in the laser disks, distortion of the optical beam caused by the thermal gradients will occur. However, embodiments of the present invention compensate for this effect by preferably using an even number of laser disks, so that alternating bounces compensate for thermal distortions. This is similar to the thermal compensation provided by zig-zag laser slab geometries known in the art.

It is preferred that the laser beam impinge the laser disks at Brewster's angle, since this angle of incidence provides for zero Fresnel loss for the "s" polarization. For $Nd:YVO_4$, Brewster's angle is 65°. Since it is preferred that the lasing beam footprint cover nearly the entire disk, the ratio of the length of each laser disk 200 to the width of each disk at angle of incidence of 65° is approximately 10 to 4. Hence, as shown in FIG. 3, for a laser beam with a width and height of 4 mm, the laser disks 200 should have a width of 4 mm and a length of 10 mm.

If, as noted above, the $Nd:YVO_4$ crystal material is oriented with its "ĉ" axis parallel to the diode bars, the longest direct gain path in the laser disk will be the width of the laser disk (or 1½ times the width of the laser disk, if total internal reflection is to be included), since, in this orientation, the $Nd:YVO_4$ crystal material does not exhibit gain at the lasing wavelength for a wave traveling along the length of the crystal (see FIG. 8 as described above). If the thickness of the lasing material within each laser disk is chosen to be 0.5 mm and the minor axis pumping diameter of each disk is 4 mm, only four disks are needed to make the gain along the lasing path larger than any parasitic path within any single laser disk, thus minimizing the possibility of parasitic oscillation. That is, each disk provides a total gain path of 1 mm (the gain path includes the path of the laser beam as it travels into the disk and then is reflected out of the disk), so four disks provide a total gain path of 4 mm. Total internal reflection provides that the total gain path of the four disks will be greater than 4 mm. Thus the total gain path will be larger than the parasitic path provided by the minor axis of each laser disk.

The pump energy 310, which impinges on the laser disks 200 with nearly normal incidence, may incur significant Fresnel loss. To minimize this loss, an alternative embodiment of the present invention has a simple quarter wavelength coating (not shown in the figures) at the pumping wavelength applied to the top surface of the disks 200. Such a coating will have nearly zero reflectivity for approximately 55° incident angle of the lasing wavelength, thus allowing the laser beam to be coupled into each laser disk 200 with nearly zero power loss. Note that this angle is the Brewster's angle for the coating and, therefore, the incident angle is a function of the coating material. The coating material will typically comprise standard dielectric coating materials well-known in the art.

Figure 5:
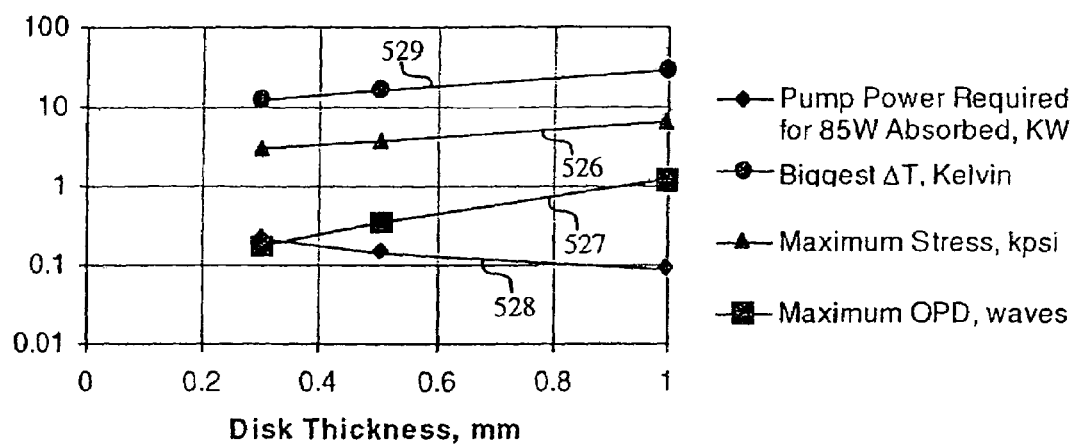
FIG. 5 is a graph showing the engineering trade-offs involved for different thicknesses of the laser disks used with embodiments of the present invention.

Preferably, the combination of thickness and doping level for the crystal are chosen as a compromise between good thermal engineering and good pump absorption. To illustrate this trade-off, a series of engineering calculations using spread-sheet finite-element analysis was undertaken, the results of which are shown in FIG. 5. These calculations assume a 5 mm by 10 mm rectangular disk of $Nd:YVO_4$, and further assume that the pump power absorbed by the disk is 85W. The temperature gradients (curve 529), stresses (curve 526), and optical phase differences (OPD) (curve 527) in $Nd:YVO_4$ disks were calculated for three thicknesses of the disk, 0.3 mm, 0.5 mm and 1 mm. From FIG. 5, it is evident that reducing disk thickness reduces both crystal stress (curve 526) and crystal OPD growth (curve 527) for the same laser output. Further, pumping efficiency decreases as the thickness of the disk decreases, since more pump power is required for the same absorbed power (curve 528). This reduction of pumping efficiency may be addressed by increasing the doping of the crystal. FIG. 5 shows that designs within the strength of the vanadate (a few thousand psi, depending on the surface treatment), having good pump efficiency and having tolerable OPD are possible.

Figure 6:
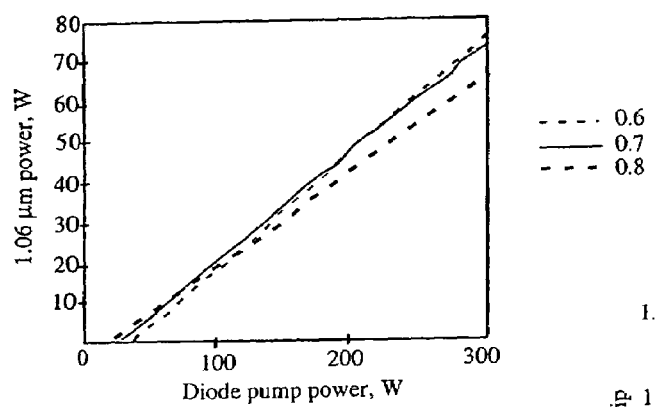
FIG. 6 is a graph illustrating the projected continuous-wave lasing performance of a six-disk $Nd:YVO_4$ laser according to the present invention, generated with computer modeling, where the parameter values of 0.6, 0.7, and 0.8 are the reflectivity of the output coupler.

Turning to FIG. 6, the simulated performance of a six-disk laser apparatus according to the present invention is shown for three different values (0.6, 0.7 and 0.8) of the output coupler 170. In the simulation results presented in FIG. 6, the wavelength of the pump energy produced by the diode pumps is 808 nm and the wavelength of the laser output is 1.06 $\mu$m. FIG. 6 shows that, theoretically, embodiments of the present invention can produce laser outputs at high powers.

Figure 7:
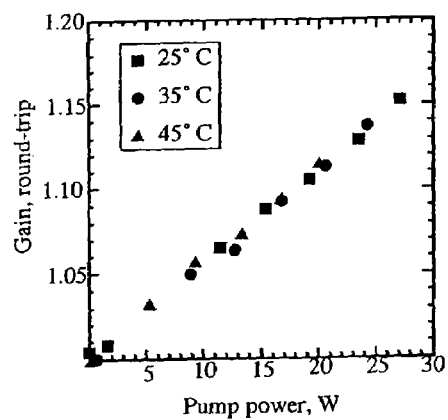
FIG. 7 is a graph generated with experimental data, showing, for different temperatures, the laser gain as-a function of pump power, for a single-disk $Nd:YVO_4$ laser module according to the present invention actually reduced to practice.

Shown in FIG. 7 are experimental data derived from actually reducing to practice a unit cell using a single $Nd:YVO_4$ disk. The gain is shown as a function of the pump power for three different temperatures. As can be seen from FIG. 7, significant gain may be obtained at high levels of pump power over a wide range of temperatures, thus allowing for a wide operating range for a device built using this unit cell.

From the foregoing description, it will be apparent that the present invention has a number of advantages, some of which have been described herein, and others of which are inherent in the embodiments of the invention described or claimed herein. Also, it will be understood that modifications can be made to the apparatus and method described herein without departing from the teachings of the subject matter described herein. As such, the invention is not to be limited to the described embodiments except as required by the appended claims.

What is claimed is:

1. A laser apparatus producing a laser beam, said apparatus comprising:

one or more first side laser disks and one or more first side laser pump devices disposed in an alternating fashion on a first side of a pump cavity; and one or more second side laser disks and one or more second side laser pump devices disposed in an alternating fashion on a second side of the pump cavity;

wherein each first side laser disk of said one or more first side laser disks is disposed to receive pump energy from a corresponding one of said one or more second side laser pump devices and each second side laser disk of said one or more second side laser disks is disposed to receive pump energy from a corresponding one of said one or more first side laser pump devices and wherein the laser beam propagates within the pump cavity from each first side laser disk to a second side laser disk adjacent to the corresponding second side laser pump device for the first side laser disk and from each second side laser disk to a first side laser disk adjacent to the corresponding first side laser pump device for the second side laser disk.

2. The laser apparatus of claim 1 further comprising:
a highly reflective element disposed at one end of the pump cavity to reflect the laser beam into the pump cavity, and
a coupler element disposed at the other end of the pump cavity to reflect a portion of the energy of the laser beam into the pump cavity and to couple the remaining energy out of the pump cavity.

3. The laser apparatus of claim 2 further comprising a Q switch disposed in a path of the laser beam.

4. The laser apparatus of claim 1, further comprising one or more reflecting surfaces disposed between said first side and said second side of said pump cavity and parallel to a path of the laser beam, said one or more reflecting surfaces directing light from a first side or second side laser pump device to a corresponding laser disk.

5. The laser apparatus of claim 1 wherein the laser beam is incident on each laser disk at approximately the Brewster's angle for the laser disk.

6. The laser apparatus of claim 1, wherein at least one laser pump device comprises one or more laser diode bars.

7. The laser apparatus of claim 1, wherein at least one laser disk comprises one or more layers of a crystalline, polycrystalline, or glass lasing medium.

8. The laser apparatus of claim 7, wherein the at least one laser disk further comprises at least one layer of a thermally conducting substrate layer and/or at least one capping layer.

9. The laser apparatus of claim 7, wherein the laser pump devices have a large divergence axis (i.e. parallel to the longest dimension of the diode bar) and a small divergence axis, the lasing medium has a crystallographic orientation and the crystallographic orientation is disposed to provide maximum absorption of a component of the pump energy parallel to the small divergence axis.

10. The laser apparatus of claim 9, wherein the laser medium comprises Nd:YVO4 material and the Nd:YVO4 material is oriented to have its "ĉ" axis parallel to the large divergence axis.

11. The laser apparatus of claim 1, wherein the total number of laser disks is an even number.

12. The laser apparatus of claim 11, wherein every laser disk has an equal or nearly equal pump region diameter and each laser disk has an equal or nearly equal pump gain thickness and the total number of disks is greater than or equal to the pump region diameter divided by the product of two times the pump gain thickness.

13. An apparatus for generating laser light, said apparatus comprising:
a highly reflective means and a partially reflective means disposed at separate ends of a pump cavity for laser light;
a plurality of face-pumped planar laser media disposed within said pump cavity; and
a plurality of means for generating laser pump energy disposed within said cavity, each of said means for generating laser pump energy directing pump energy to a corresponding one face-pumped planar laser media of said plurality of face-pumped planar laser media,
wherein said plurality of face-pumped laser media are cooperatively aligned with said highly reflective means and said partially reflective means such that laser light propagating in said pump cavity is incident on each one of said plurality of face-pumped laser media at a non normal angle and said laser light travels between said highly reflective means and said partially reflective means in a zig-zag path.

14. The apparatus of claim 13, wherein said plurality of face pumped planar laser media and said plurality of means for generating laser pump energy are disposed on a first side and a second side of said pump cavity, said first side having alternating face-pumped laser media and means for generating laser pump energy and said second side having alternating face-pumped laser media and means for generating laser pump energy.

15. The apparatus of claim 14, wherein said each one of said plurality of face-pumped planar laser media comprises a laser disk having one or more layers of a crystalline, polycrystalline, or glass lasing medium and each one of said means for generating laser pump energy comprises one or more laser diode bars.

16. The apparatus of claim 15, wherein said one or more laser diode bars have a large divergence axis and a small divergence axis and each laser disk has a crystallographic orientation disposed to provide maximum absorption of a component of the pump energy parallel to the small divergence axis.

17. The apparatus of claim 16, wherein said lasing medium comprises Nd:YVO4 material and the Nd:YVO4 material is oriented to have its "ĉ" axis parallel to the large divergence axis.

18. The apparatus of claim 15, wherein at least one laser disk further comprises at least one thermally conducting layer and/or at least one capping layer.

19. The apparatus of claim 13 wherein the plurality of face pumped planar laser media comprise an even number of face-pumped planar laser media.

20. The apparatus of claim 13, wherein the laser light propagating in said pump cavity is incident on each one of said plurality of face-pumped laser media at or near the Brewster's angle for the face pumped planar laser media.

21. The apparatus of claim 13, wherein each one of said face-pumped laser media has an equal or nearly equal pump gain diameter and an equal or nearly equal pump gain thickness and the total number of face-pumped media is greater than or equal to the pump region diameter divided by the product of two times the pump gain thickness.

22. A method for generating laser light, said method comprising the steps of:
providing a pump cavity having an upper side, a lower side opposite the upper side, a first end, and a second end opposite the first end; disposing one or more planar laser media on the upper side of the pump cavity,
disposing one or more planar laser media on the lower side of the pump cavity;
applying pump energy to the one or more planar laser media on the upper side from a location on the lower side and to the one or more planar laser media on the lower side from a location on the upper side; and
reflecting laser light between the first end and the second end such that the laser light enters each one of the one or more planar laser media at an angle approximately equal to the Brewster's angle for the planar laser media and the laser light propagates in said pump cavity in a zig-zag path between the planar laser media on the upper side and the planar laser media on the lower side.

23. The method of claim 22, wherein the step of applying pump energy comprises the steps of:
disposing one or laser pump devices adjacent each planar laser media on the upper side and disposing one or more laser pump devices adjacent each planar laser media on the lower side.

24. The method of claim 23, wherein the laser pump devices comprise one or more laser diode bars.

25. The method of claim 24, wherein each one of said plurality of planar laser media comprises a laser disk having one or more layers of a crystalline, polycrystalline, or glass lasing medium.

26. The means of claim 25, wherein each one of said one or more laser diode bars have a large divergence axis and a small divergence axis and each laser disk has a crystallographic orientation disposed to provide maximum absorption of a component of the pump energy parallel to the small divergence axis.

27. The means of claim 26, wherein said lasing medium comprises Nd:YVO4 material and the Nd:YVO4 material is oriented to have its "ĉ" axis parallel to the large divergence axis.

28. The method of claim 23, further comprising the step of disposing one or more reflective surfaces between the first end and the second end and parallel to the path of the laser light, the reflective surfaces directing light from laser pump devices onto said planar laser media.

29. The method of claim 22, wherein the step of reflecting laser light further comprises the steps of:
    disposing a highly reflective element at the first end and
    disposing a coupler element at the second end, the coupler element partially reflecting the laser light and partially transmitting the laser light.

30. The method of claim 22, further comprising the step of disposing a Q-switch in a path of the laser light.

31. The method of claim 22, wherein each one of said planar laser media has an equal or nearly equal pump gain diameter and an equal or nearly equal pump gain thickness and the total number of planar laser media is greater than or equal to the pump region diameter divided by the product of two times the pump gain thickness.

32. The method of claim 31, wherein the total number of planar laser media is an even number.

* * * * *